Figure 1:
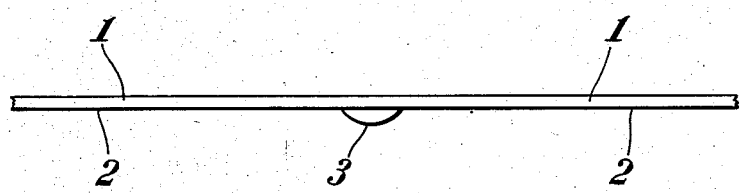

Oct. 2, 1951　　　　　T. CORSI ET AL　　　　　2,569,516
OPTICAL SYSTEM FOR THE DETERMINATION OF THE FOCAL POINT

Filed July 9, 1948

INVENTORS:
TELEMACO CORSI
LUIGI PICCHIONI

By:
Haseltine, Lake & Co.
AGENTS

Patented Oct. 2, 1951

2,569,516

UNITED STATES PATENT OFFICE 2,569,516

OPTICAL SYSTEM FOR THE DETERMINATION OF THE FOCAL POINT

Telemaco Corsi and Luigi Picchioni, Rome, Italy

Application July 9, 1948, Serial No. 37,758
In Italy April 16, 1948

13 Claims. (Cl. 95—44)

The object of the present invention is an optical system for the determination of the focal point, i. e., an optical system for verifying whether an image formed by another optical system is perfectly focussed.

The optical system according to the invention is based on the well known optical principle of the equality between the images formed on the first and second nodal planes respectively of an optical system. The nodal planes are those planes that are parallel to the plane of an optical system or lens and pass through the two points so located on the axis of the optical system or lens that any incident ray directed through one of the points will produce a parallel emergent ray directed through the other of the points. When from the second nodal plane of an optical system an image is observed, if this image does not exactly lie on the first nodal plane, it will appear as distorted and the distortion will result greater or smaller, at a parity or as a function of distance of the image from the said first nodal plane, according to the sensitivity of the optical system employed.

According to the present invention, in order to attain the above mentioned object in a simple, cheap and reliable manner, the above mentioned principle is applied by making use of cylindrical lenses as this kind of lens is one of the simplest and most sensitive means for estimating the distortion of an image when the object does not happen to fall on the corresponding nodal plane. This is due to the known optical properties of the cylindrical lens which has two focal lines at right angles to one another, so that an equivalent rotation of the image takes place when the object point passes from one focal line to another.

Therefore, the invention consists in general in the utilisation of one or more cylindrical lens elements of any shape (filiform, square, rectangular, cylindrical, etc.) mounted in such a way that its first nodal plane or their common first nodal plane be exactly determined and that the said plane may be brought to coincide with the plane of the image to be analysed in respect of its focussing.

In the particular application of the invention to the focussing of a photo or cinematographic camera utilising a ground glass, the invention is actuated by means of a fixed or removable application to the ground glass of one or more elements of cylindrical lenses of any form, designed, for what concerns the radius of curvature, depth and/or mounting, in such a way that the perfect coincidence of the first nodal plane of the above mentioned element or elements with the active surface of the ground glass is insured.

Figure 2:
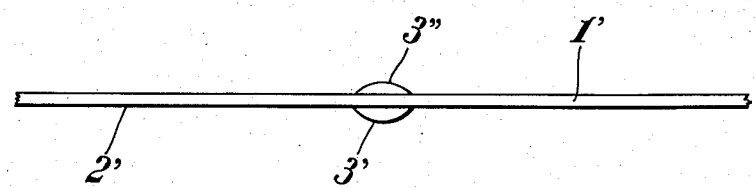

Although the foregoing explanation is sufficient to disclose to those skilled in the art the nature of the invention and in what manner it can be actuated, in the accompanying drawing Figures 1 and 2 diagrammatically illustrate two embodiments of the invention, it being understood that no exclusive or limitative interpretation shall be given to the specification and/or drawing.

In Figure 1, reference numeral 1 indicates a fragment of a ground glass, of which 2 is the active surface, whilst 3 is an element of cylindrical lens the first nodal plane of which is coincident with surface 2.

In Figure 2, the ground glass is indicated by 1' and its active surface by 2', 3' and 3'' being two elements of cylindrical lenses designed in such a way and so located that the first nodal plane of the system coincides with the active face of the ground glass.

More than one optical system according to the invention can be fitted on the ground glass of any photographic or cinematographic camera provided that all of them have common nodal planes.

The manner of operation is very simple.

Looking at the image formed on the ground glass through an optical system according to the invention applied thereto, it will be observed that, when the said image is not focussed, its lines will not have the same direction in the space as have the corresponding lines of the true object; if the image is only partially included within the field of the optical system according to the present invention, there will be no coincidence between the portion of the image inside the field and the portion outside of it. If the focussing device is then moved in the proper direction, as the focussing becomes improved the two portions of the image approach the condition of coincidence, and finally coincide when the focussing is perfect.

This is much more evident when a cylindrical lens elements or unit is placed obliquely, that is with its axis at an angle to the direction assumed on the ground glass by the vertical lines of the observed object or image, as with this arrangement the said vertical lines will appear inclined in those parts included in the field of the device if the image is not focussed; said inclination decreases as the condition of focussing is approached and becomes completely annulled when the focussing is reached. One or more obliquely disposed units can be used, for instance two adjacent to one another.

Although particular reference has been made to the application of the optical system of the invention to a ground glass, it is to be understood that such an optical system can also be used without any combination with a ground glass.

For instance, an optical system according to the invention could be built as an independent unit, and the unit applied in any suitable manner on the plane of the image to be analysed.

Of course, other modifications and/or particular arrangements can be adopted without departing from the scope of the invention.

What we claim is:

1. In combination, a carrier for the image produced by an optical system and a cylindrical lens element having an exactly defined first nodal plane, said element being supported relative to said carrier to position first nodal plane coincidentally with said carrier.

2. In combination, a planar carrier for receiving the image produced by an optical system on a surface thereof and a cylindrical lens element having an exactly defined first nodal plane, said element being supported relative to said planar carrier to position said first nodal plane coplanar with said image receiving surface of said carrier.

3. In combination, a ground glass for carrying the image produced by an optical system on a face thereof and a cylindrical lens element having an exactly defined first nodal plane, said element being supported relative to said ground glass for coincidence of said first nodal plane with said image carrying face of said ground glass.

4. In combination, a carrier for the image produced by an optical system and a plurality of cylindrical lens elements each having an exactly defined first nodal plane, said elements being supported relative to each other and to said carrier so that the nodal planes thereof are coincidental with one another and with said carrier.

5. In combination, a ground glass for carrying the image produced by an optical system on a face thereof and a plurality of cylindrical lens elements each having an exactly defined first nodal plane, said elements being supported relative to each other and to said carrier so that the nodal planes thereof are coincidental with one another and with said image carrying face of said ground glass.

6. In combination, a piece of ground glass having an active side being the carrier of the image produced by an optical system, a first cylindrical lens element arranged on one side of said ground glass piece, and a second cylindrical lens element arranged on the opposite side of said ground glass piece, said cylindrical lens elements forming a unit having an exactly defined first nodal plane, said unit being arranged for coincidence of the first nodal plane thereof with the image-carrying side of said ground glass piece.

7. In combination, a plane piece of ground glass having an active side being the carrier of the image produced by an optical system, a first cylindrical lens element arranged on one side of said ground glass piece, and a second cylindrical lens element arranged on the opposite side of said ground glass piece, said cylindrical lens elements forming a unit having an exactly defined first nodal plane, said unit being arranged for coincidence of the first nodal plane thereof with the image-carrying side of said ground glass piece.

8. In combination, a piece of ground glass having an active side being the carrier of the image produced by an optical system, a plurality of units each comprising a first cylindrical lens element arranged on one side of said ground glass piece, and a second cylindrical lens element arranged on the opposite side of said ground glass piece, said units having exactly defined first nodal planes and being arranged for coincidence of their first nodal planes with one another and with the image-carrying side of said ground glass piece.

9. In combination, a ground glass for carrying the image produced by an optical system on a face thereof and a cylindrical lens element having an exactly defined first nodal plane, said element being supported relative to said ground glass to position said first nodal plane coincidentally with said image carrying face of said ground glass and with the axis of said cylindrical lens element inclined to the direction of the vertical lines of the image on said ground glass.

10. In combination, a piece of ground glass having an active side carrying the image produced by an optical system, and two cylindrical lens elements arranged side by side with their axes parallel, said cylindrical lens elements having exactly defined first nodal planes and being arranged for coincidence of the first nodal planes thereof with each other and with the image-carrying side of said ground glass piece, the parallel axes of said cylindrical lens elements being arranged at an inclination to the direction of the vertical lines of the image on said ground glass piece.

11. In combination, a first optical system for producing an image, a carrier supported relative to said first optical system for receiving the image produced by the latter on a face thereof, and a second optical system including a cylindrical lens having an exactly defined first nodal plane, said second optical system being positioned for viewing of a portion of the produced image on said receiving face of the carrier, said cylindrical lens being supported relative to said carrier so that said first nodal plane is coincidental with said image receiving face whereby the portion of the image viewed through said second optical system is aligned with the remainder of the image on said carrier when the first optical system is focused on said image receiving face, and said portion of the image is rotated in the plane of said face relative to said remainder of the image when said face is out of the focus of said first optical system.

12. The combination as set forth in claim 11, wherein said cylindrical lens is positive.

13. The combination as set forth in claim 11, wherein said cylindrical lens is negative.

TELEMACO CORSI.
LUIGI PICCHIONI.

REFERENCES CITED

The following references are of record in the file of this patent:

UNITED STATES PATENTS

| Number | Name | Date |
|---|---|---|
| 521,064 | Weyde | June 5, 1894 |
| 540,184 | Norris | May 28, 1895 |
| 983,047 | Grant | Jan. 31, 1911 |
| 1,387,267 | Holle | Aug. 9, 1921 |
| 1,692,973 | Babcock | Nov. 27, 1928 |
| 1,729,106 | Hallwood | Sept. 24, 1929 |
| 1,761,947 | Wedin | June 3, 1930 |
| 1,771,844 | Eilenberg et al. | July 29, 1930 |
| 1,810,598 | Cummings | June 16, 1931 |
| 1,887,872 | Ernst | Nov. 15, 1932 |
| 1,900,332 | Coradi et al. | Mar. 7, 1933 |
| 1,986,522 | Owens | Jan. 1, 1935 |
| 2,026,176 | Jaeckel | Dec. 31, 1935 |